May 7, 1946.  C. M. FRIDEN ET AL  2,399,917
CALCULATING MACHINE
Filed July 31, 1940   13 Sheets-Sheet 1
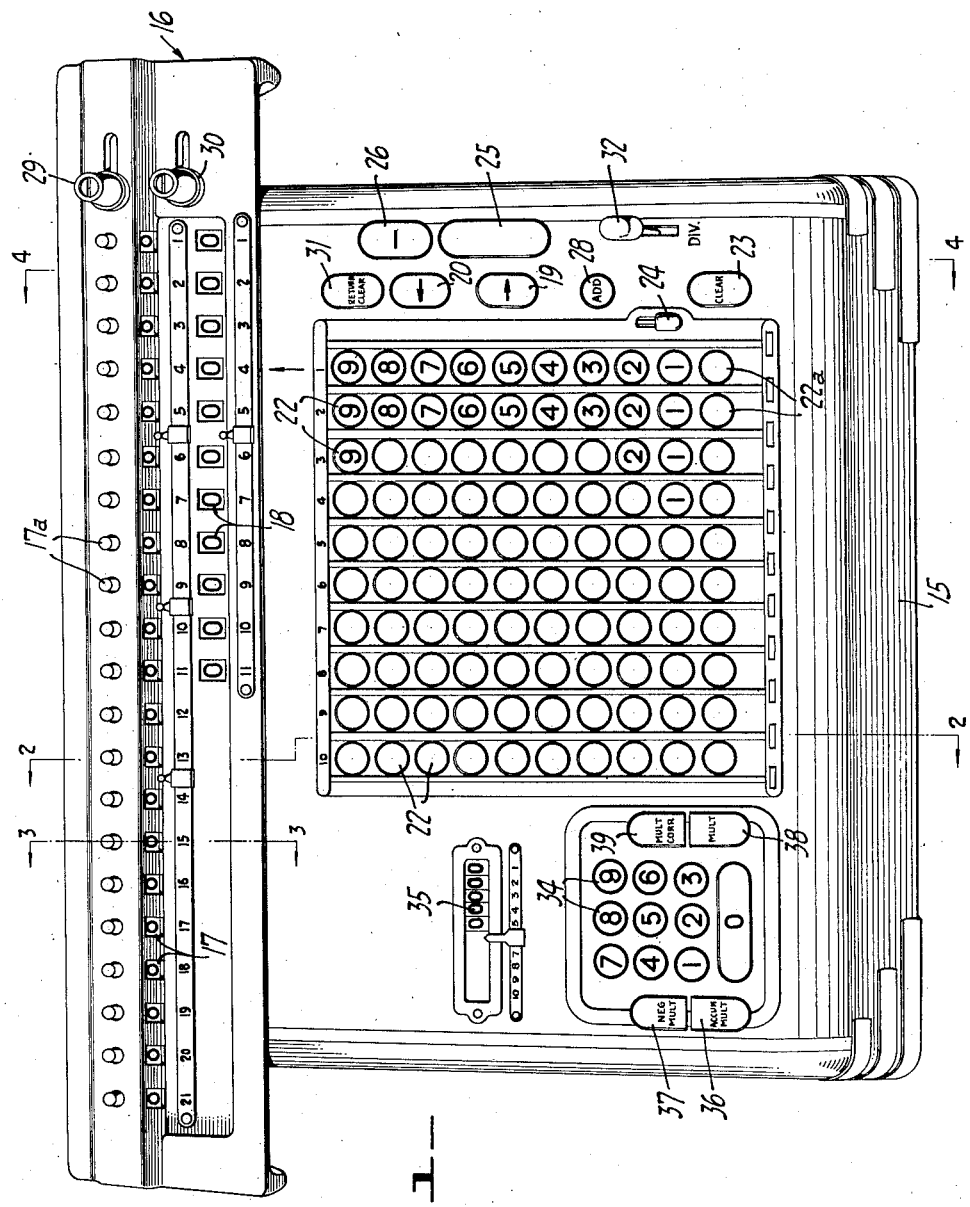
Inventors
Carl M. Friden
Anthony B. Machado
By Harper Allen
Attorney

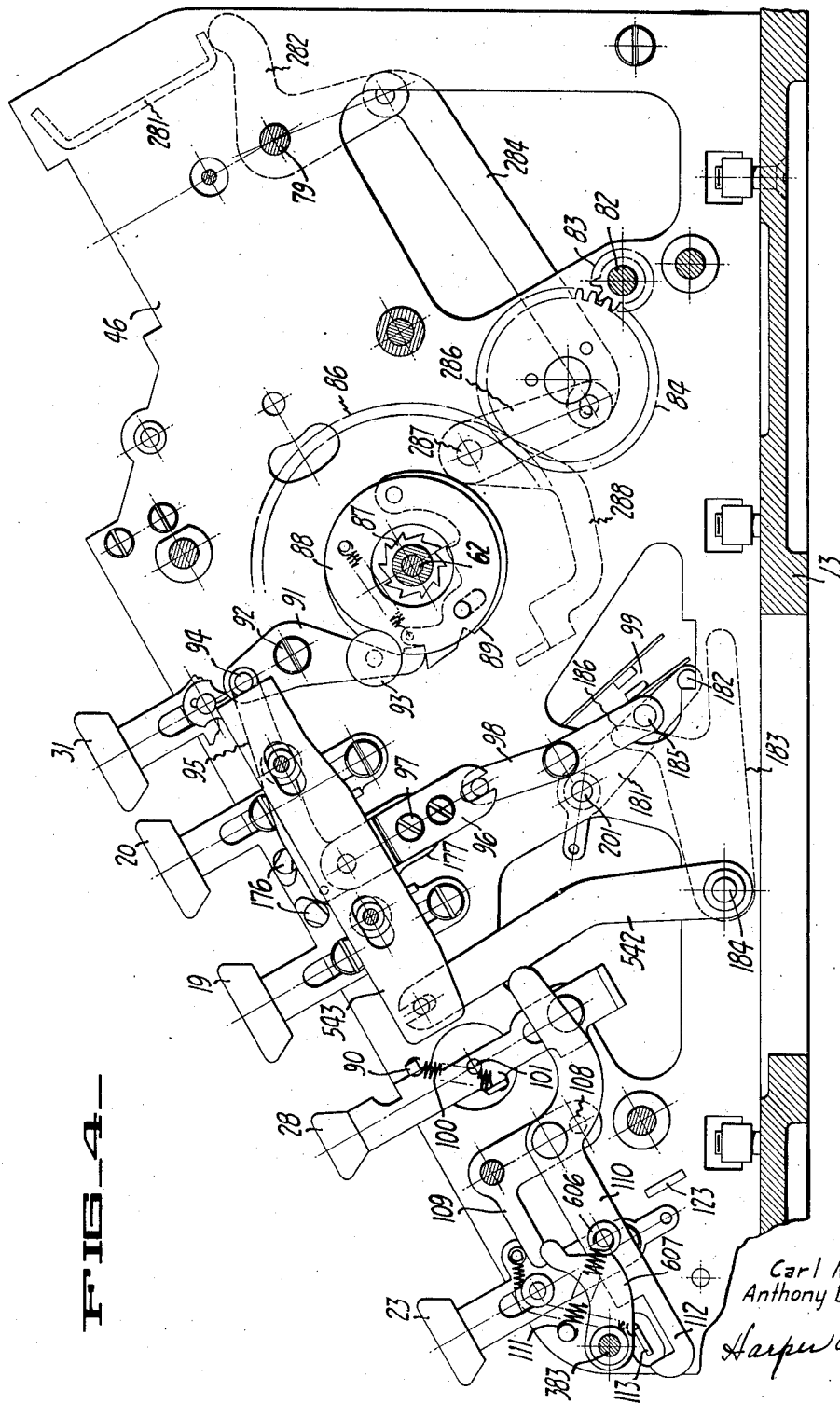

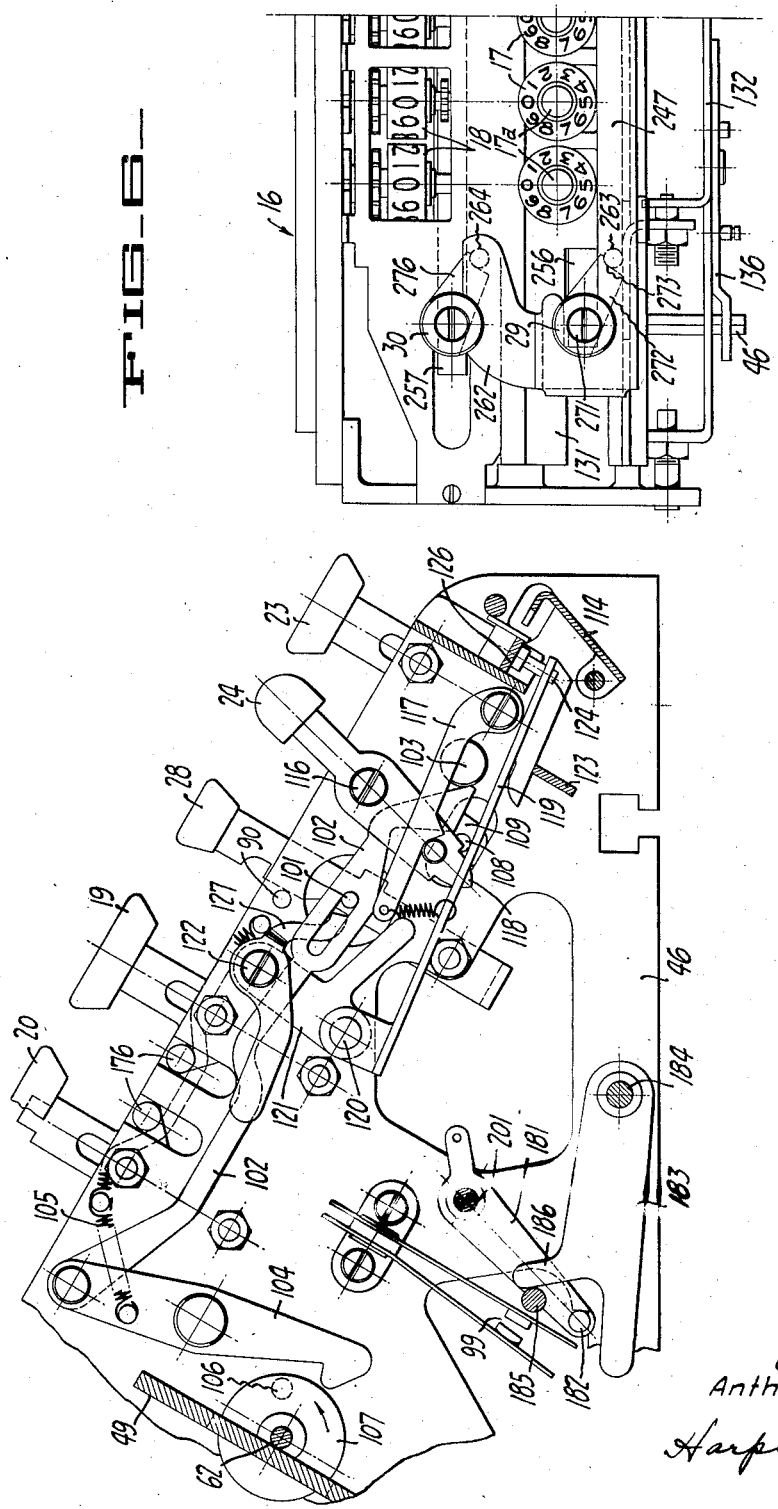

May 7, 1946.  C. M. FRIDEN ET AL  2,399,917
CALCULATING MACHINE
Filed July 31, 1940   13 Sheets-Sheet 5
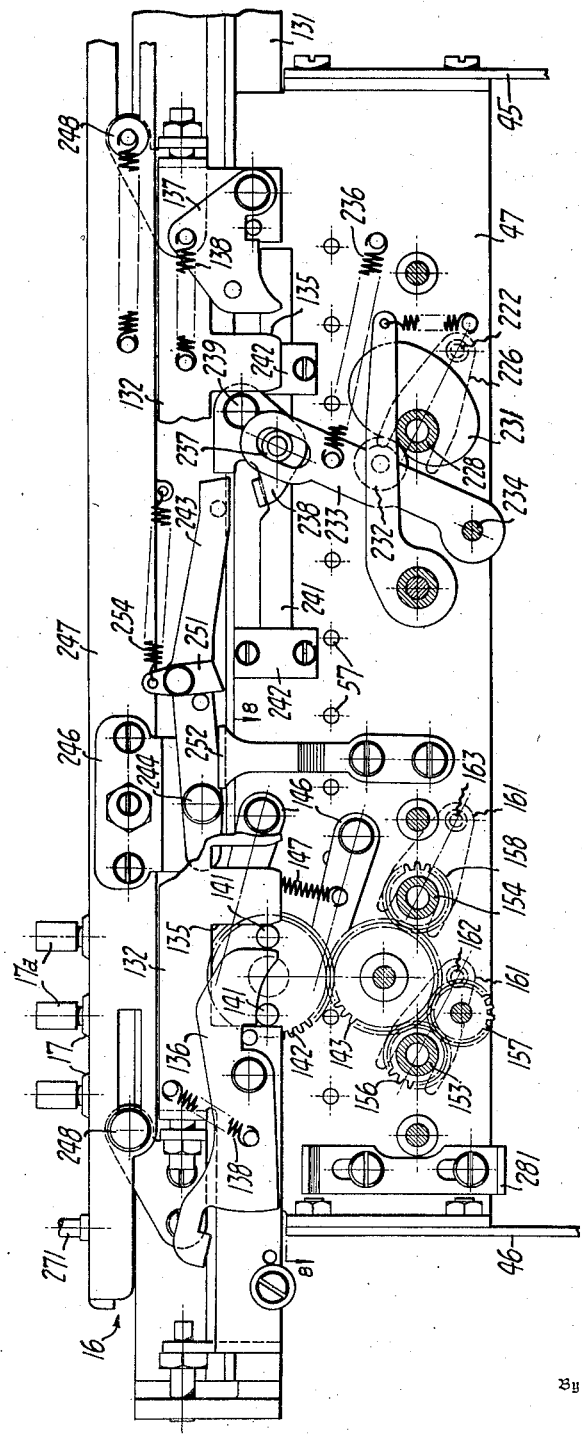
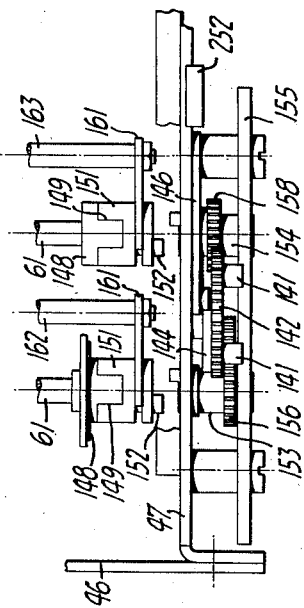
Inventors
Carl M. Friden
Anthony B. Machado
By Harper Allen
Attorney

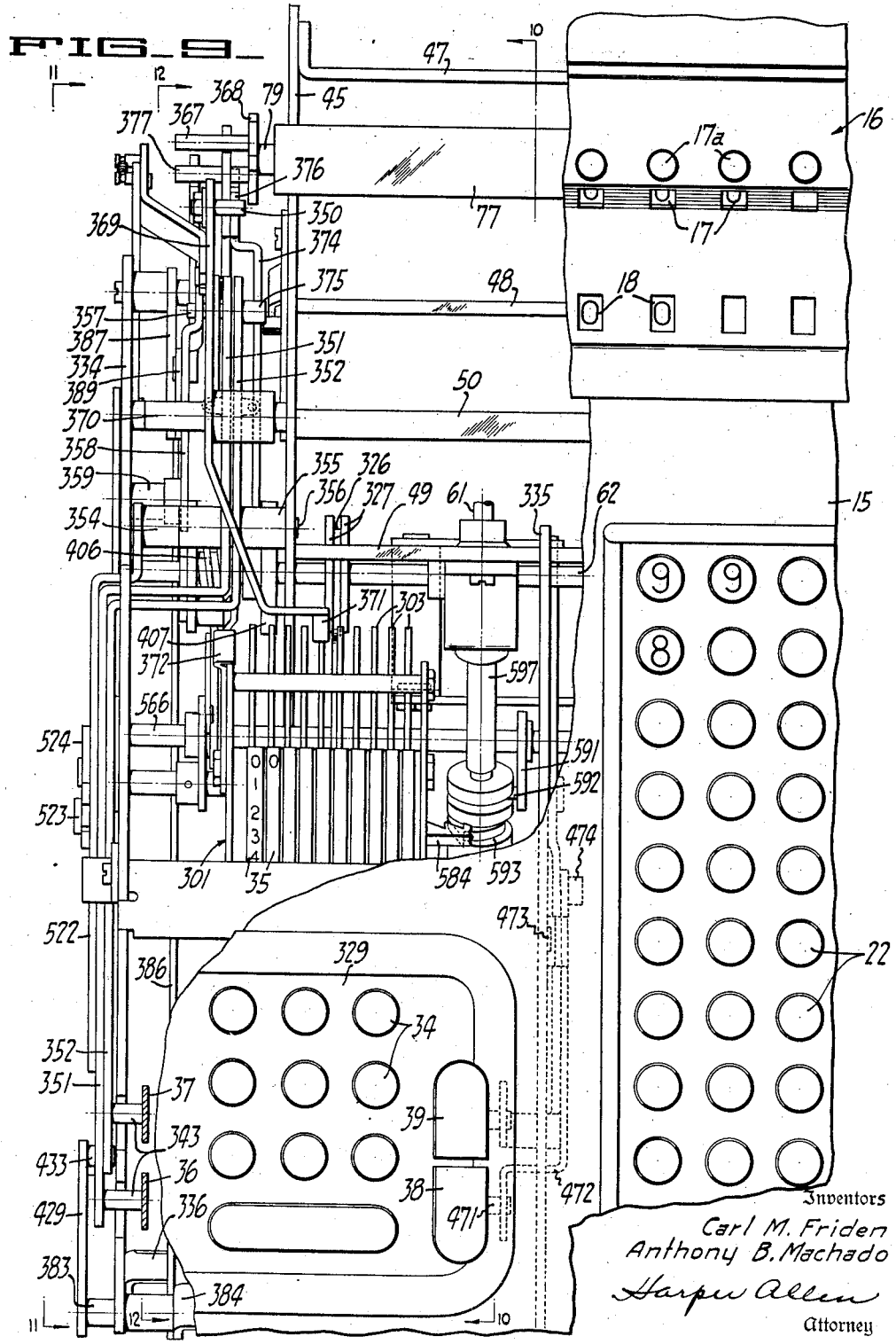

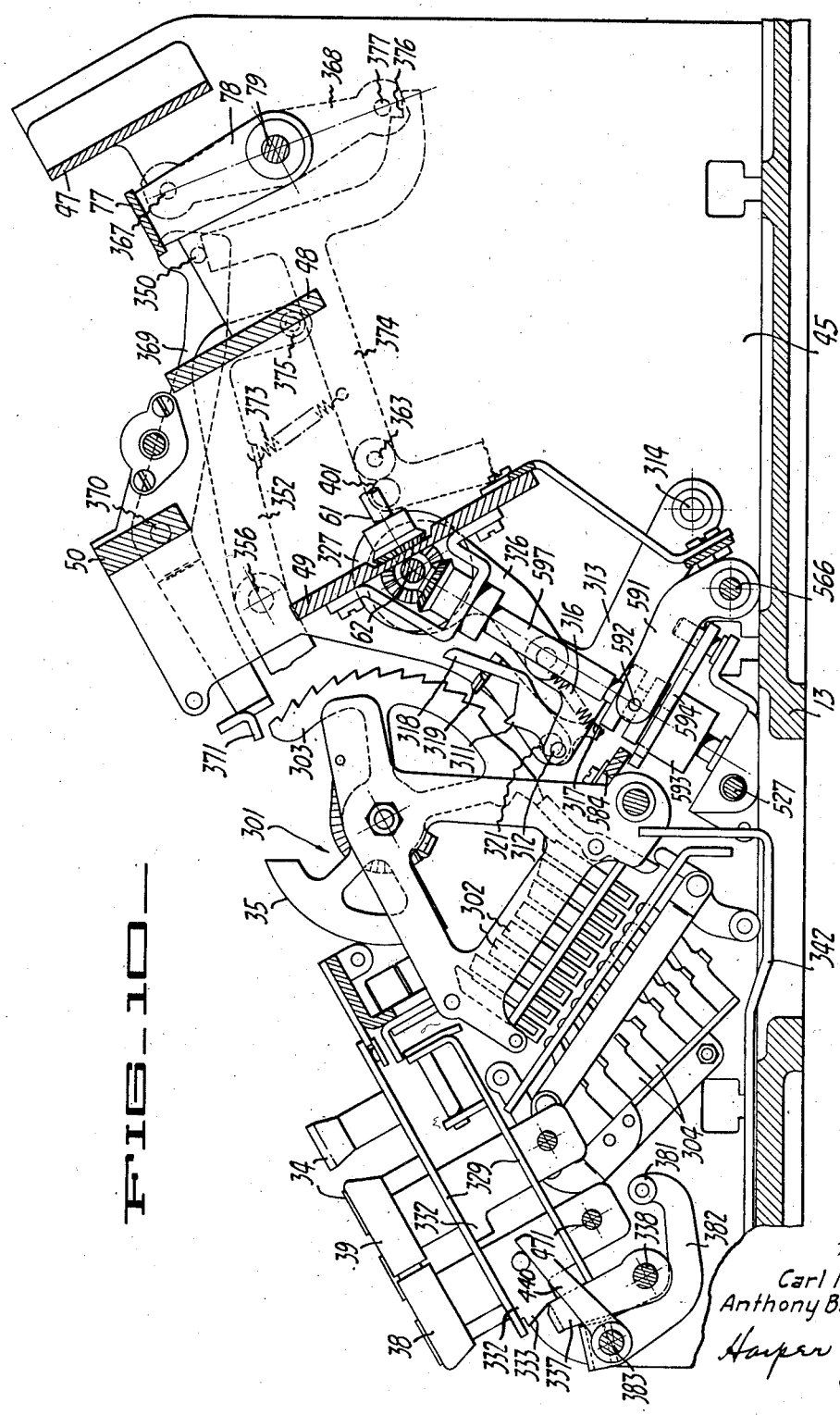

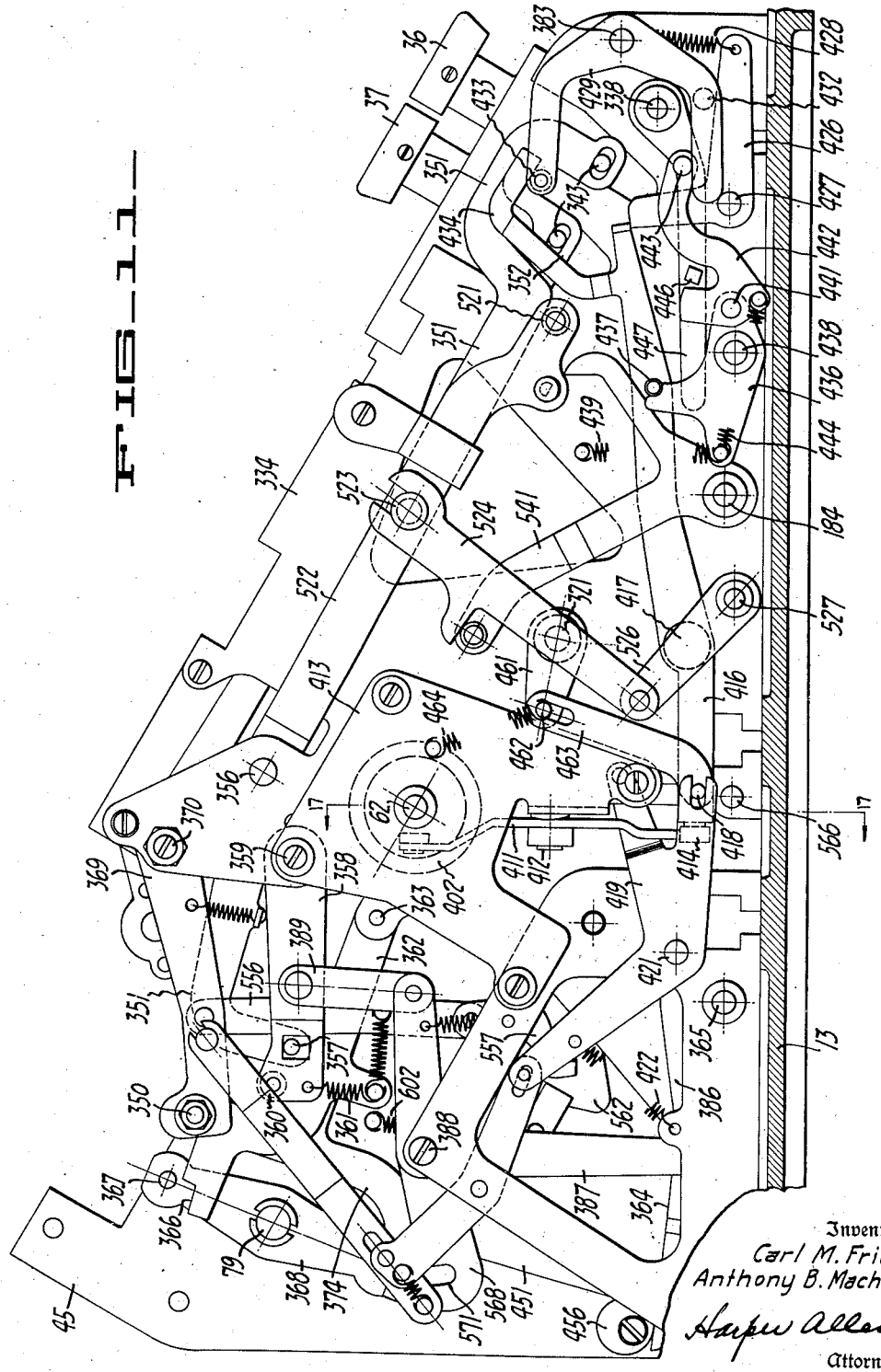

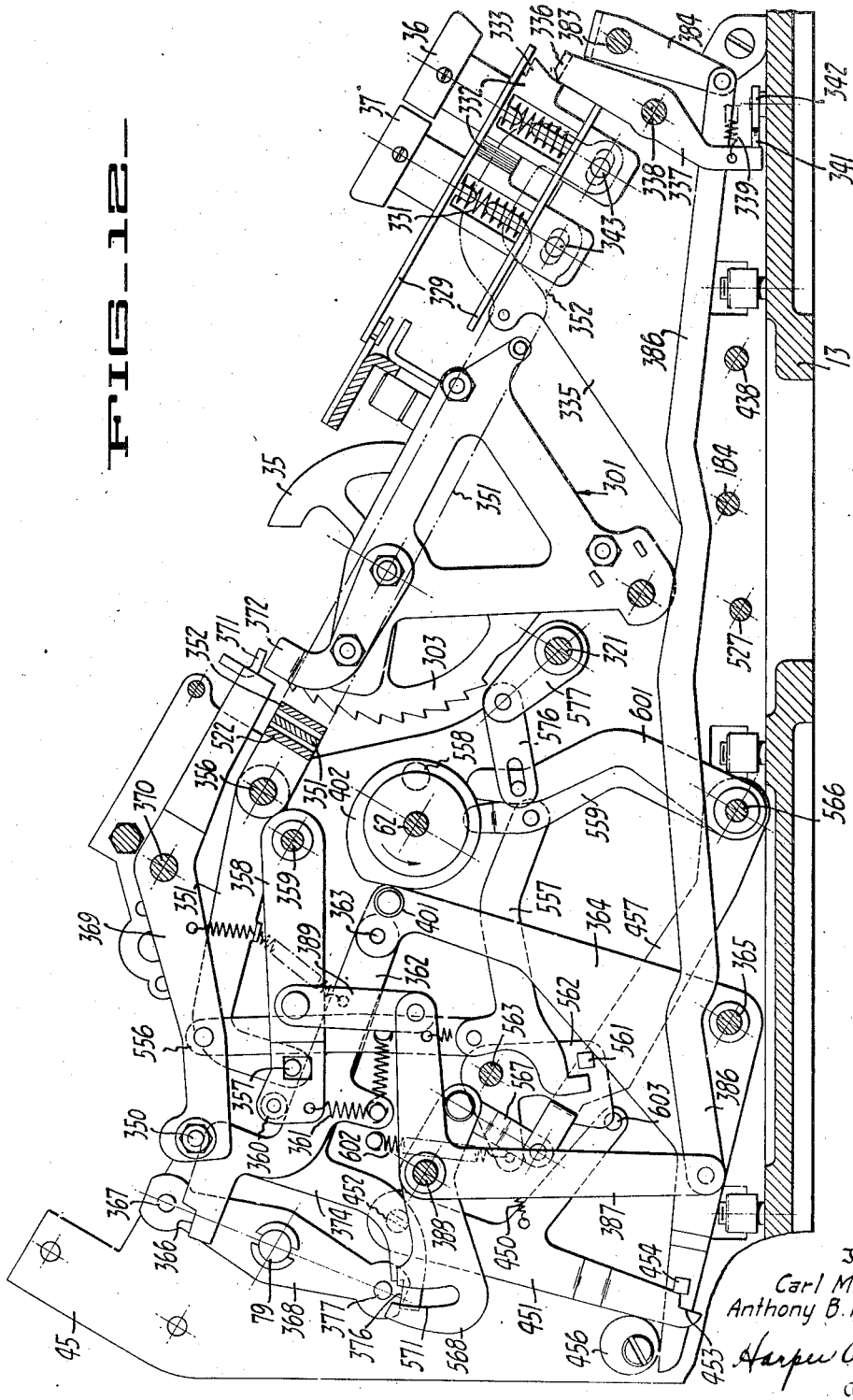

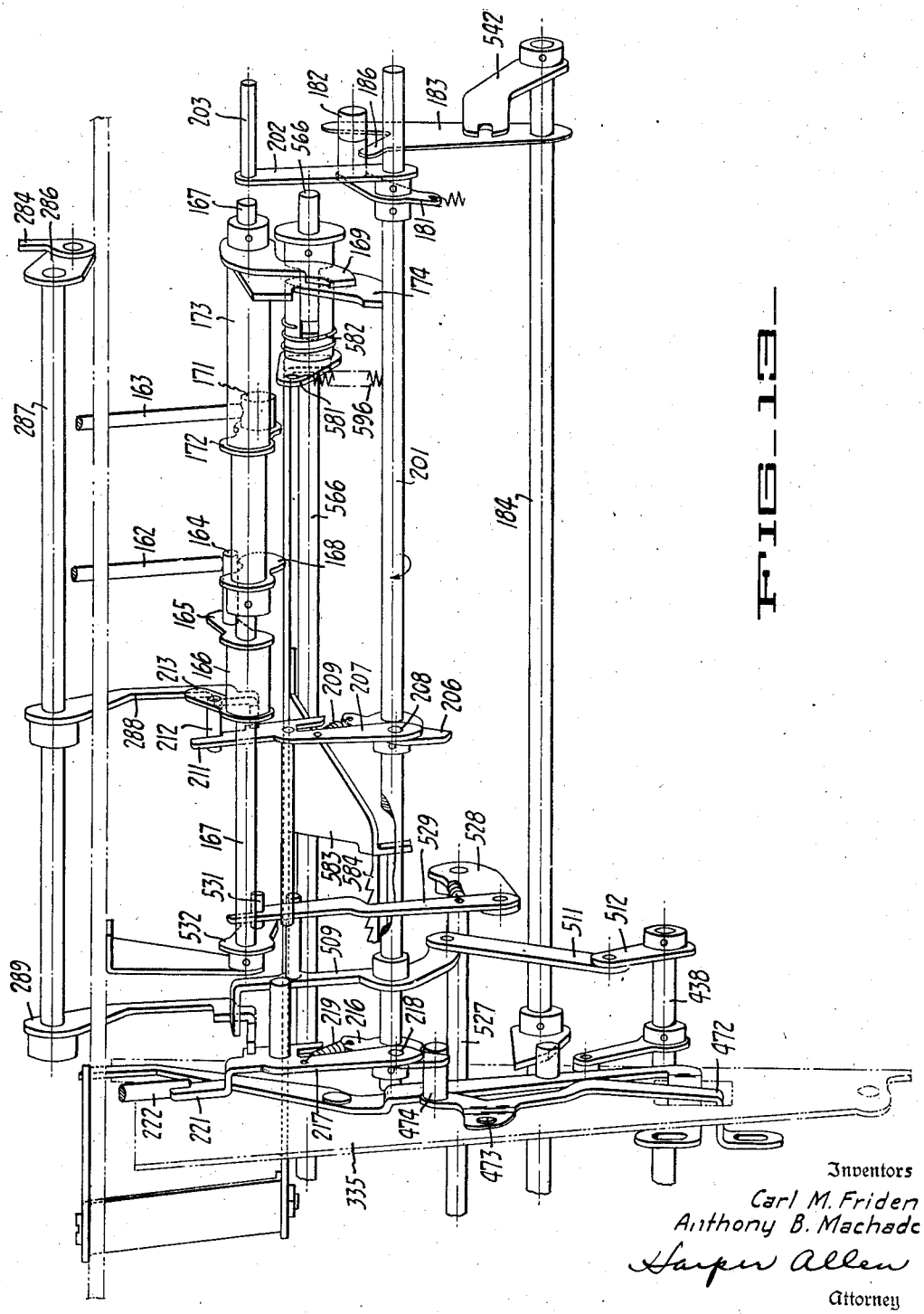

May 7, 1946.  C. M. FRIDEN ET AL  2,399,917
CALCULATING MACHINE
Filed July 31, 1940   13 Sheets-Sheet 11
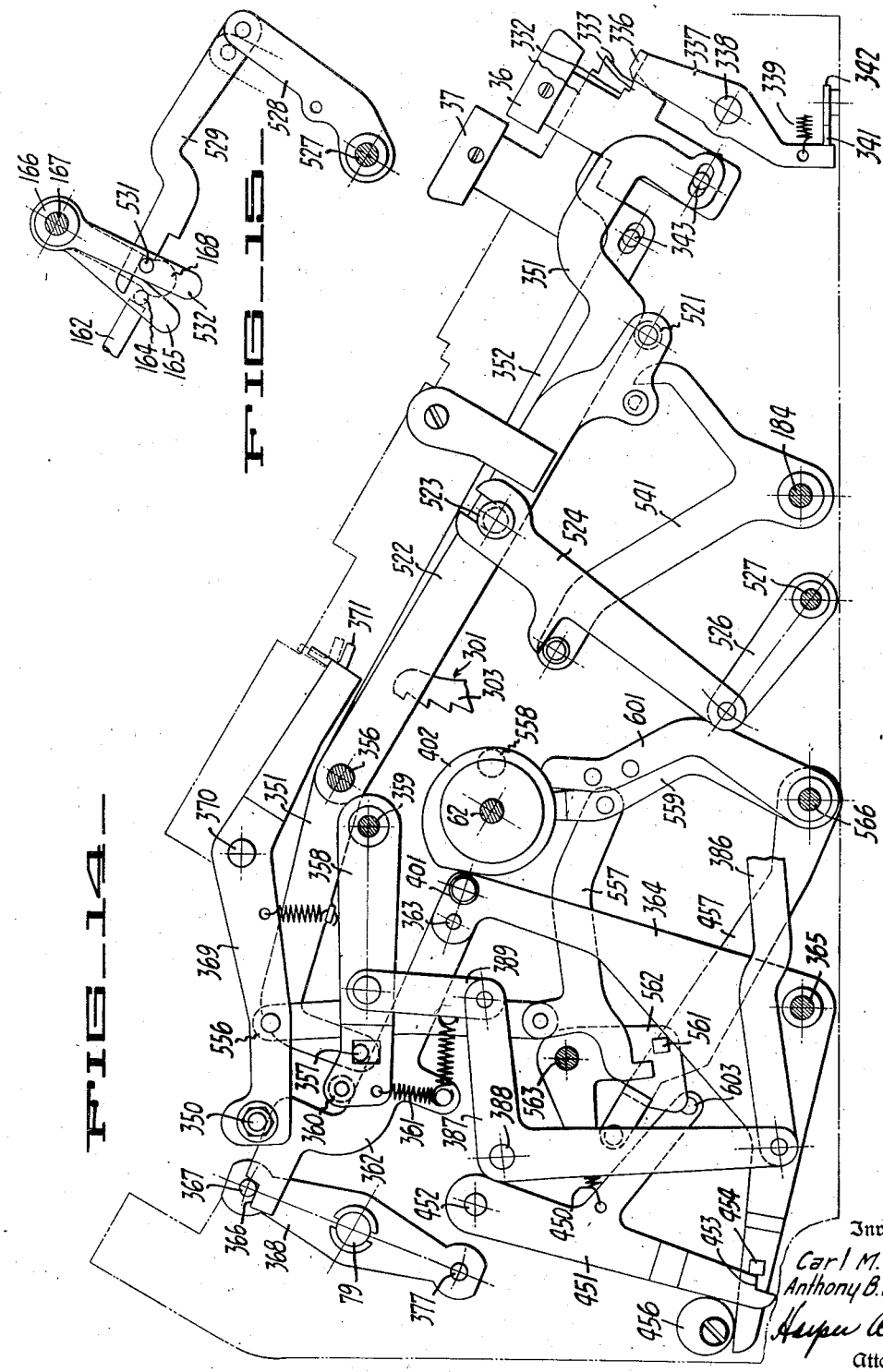

May 7, 1946.  C. M. FRIDEN ET AL  2,399,917
CALCULATING MACHINE
Filed July 31, 1940  13 Sheets-Sheet 12

Inventors
Carl M. Friden
Anthony B. Machado
Harper Allen
Attorney

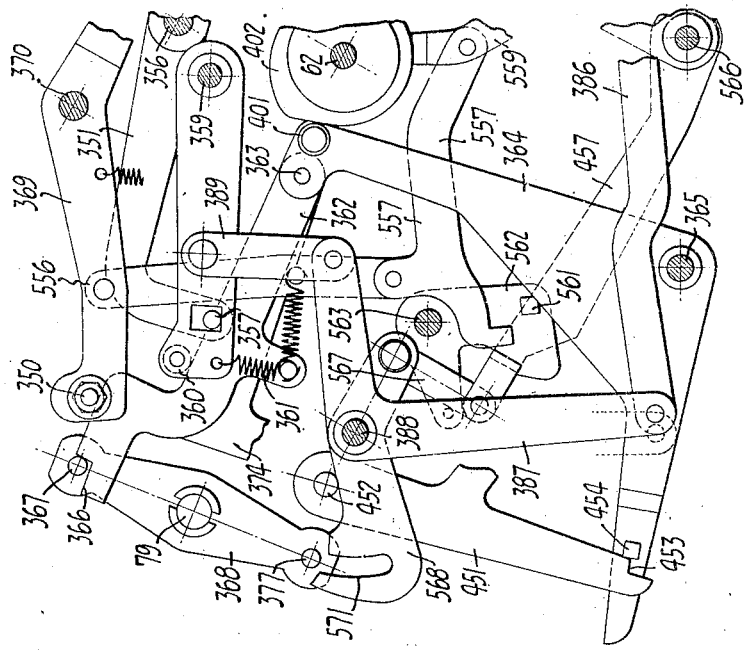
FIG_19
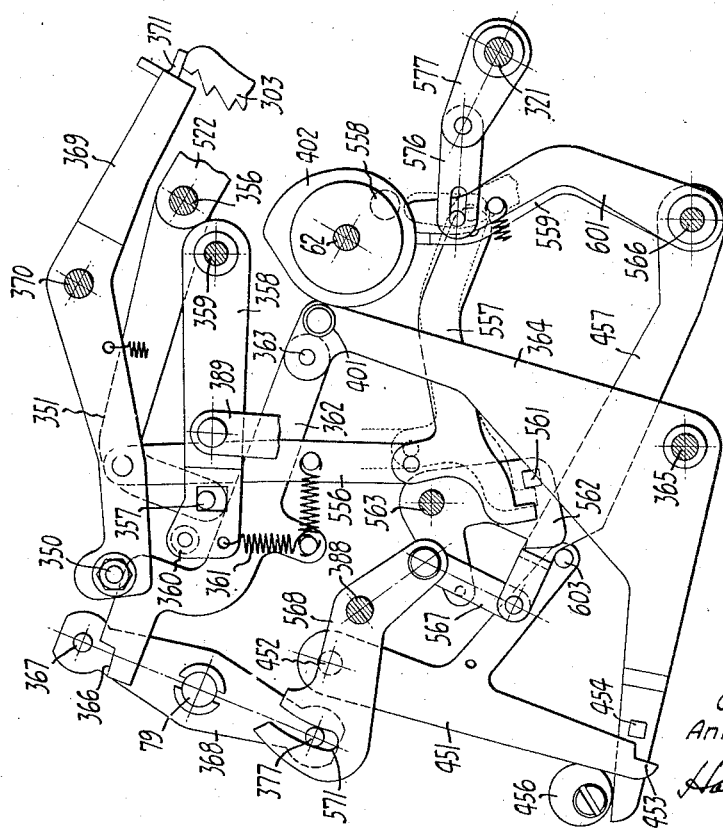
FIG_18
Inventors
Carl M. Friden
Anthony B. Machado
Harper Allen
Attorney Patented May 7, 1946

2,399,917

UNITED STATES PATENT OFFICE 2,399,917

CALCULATING MACHINE

Carl M. Friden, Pleasanton, and Anthony B. Machado, Oakland, Calif., assignors to Friden Calculating Machine Co., Inc., a corporation of California Application July 31, 1940, Serial No. 348,966

7 Claims. (Cl. 235—63)

This invention relates to calculating machines and is concerned more particularly with the provision of improved means for performing plural order multiplication operations.

It is an object of the invention to provide an improved calculating machine in which plural order multiplying operations can be carried out in an advantageous manner.

Another object of the invention is to provide an improved calculating machine capable of performing certain calculations such as compound interest, amortization, bond yield rates and the like in a simplified and expeditious manner.

Another object of the invention is to provide an improved calculating machine of the character referred to in which the multiplying operation can be selectively controlled by means of a plurality of manually operable control keys, each one of which selects certain characteristics of the operations being performed.

Another object of the invention is to provide an improved plural order multiplying mechanism for a calculating machine in which the accumulator is left in the proper position for a division or other operation at the end of the multiplication.

Another object of the invention is to provide an improved multiplying mechanism for a calculating machine in which the registers of the machine can be properly conditioned for the multiplying operation automatically.

Another object of the invention is to provide an improved calculating machine capable of carrying out the foregoing objects and in which all of the power-driven operations are performed by a single train of power flow from a motor whereby the machine can operate continuously and uninterruptedly throughout the calculating operation.

Other objects and advantages will be apparent from the following description of a preferred embodiment of the invention as illustrated in the accompanying drawings, in which:

Figure 1 is a perspective plan view of a calculating machine embodying the invention;

Figure 2 is a longitudinal sectional elevation through the machine taken in a plane indicated by the line 2—2 in Figure 1;

Figure 3 is a fragmentary sectional view through the carriage, the view being taken as indicated by the line 3—3 in Figure 1 and being complementary to Figure 2;

Figure 4 is an elevational view partly in section showing certain of the control mechanisms, the view being taken as indicated by the line 4—4 in Figure 1;

Figure 5 is a sectional elevational view of a part of the keyboard release mechanism;

Figure 6 is a plan view of one end of the carriage with the cover removed to illustrate a portion of the resetting control mechanism;

Figure 7 is a rear elevational view partly in section of the machine;

Figure 8 is a plan view of the shift drive mechanism, the view being taken as indicated by the line 8—8 in Figure 7;

Figure 9 is an enlarged plan view of the left-hand portion of the machine with a part of the casing broken away to illustrate the multiplier control mechanism;

Figure 10 is a sectional elevation of a portion of the multiplier mechanism, the view being taken as indicated by the line 10—10 in Figure 9;

Figure 11 is a left side elevational view of the machine with the cover removed and the base shown in section as indicated by the line 11—11 in Figure 9;

Figure 12 is a sectional view of the multiplier control mechanism, the plane of the view being indicated by the line 12—12 in Figure 9;

Figure 13 is an exploded perspective view of a part of the control linkage utilized in the shifting, resetting, and multiplying operations;

Figure 14 is a view similar to Figure 11 with certain parts omitted and with the parts shown in the operative position immediately after depression of one of the multiplier keys but before the operation of the machine starts;

Figure 15 is a fragmentary view of a part of the control linkage as shown in Figure 13;

Figure 18 is an operational view similar to Figure 14 but showing the parts as positioned for shifting during the multiplying operation;

Figure 19 is an operational view showing the position of the parts after depression of the multiplier key 38 which initiates both return and resetting of the accumulator as a preliminary to the multiplying operation.

General description (Figure 1)

Figures 16, 17:
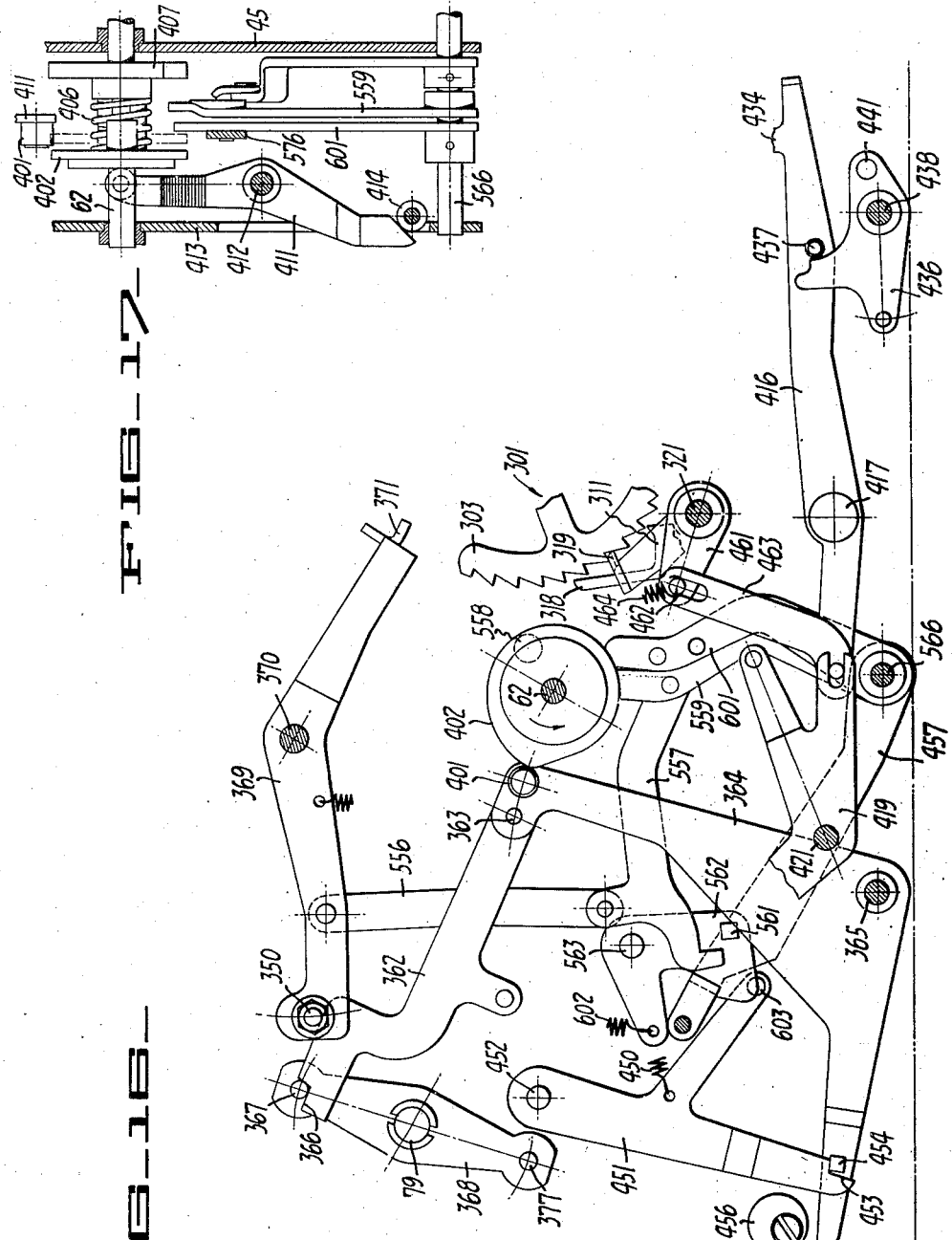
Figure 16 is a fragmentary view of a part of the control mechanism as positioned at the beginning of a multiplying operation after return of the accumulator to its end position.
Figure 17 is a fragmentary vertical section taken in a plane indicated by the line 17—17 in Figure 11.

The invention is described in a preferred form as adapted to a Thomas type calculating machine. Referring to Figure 1, the machine includes a body 15 in which the actuating, selecting, and control mechanisms are mounted, and carriage 16 which is mounted for endwise shifting movement transversely of body 15 and which carries numeral wheels 17 and 18 of the accumulator and revolutions counter, respectively. Numeral wheels 17 are provided with projecting twister handles 17a to provide for individual setting thereof. Carriage 16 can be shifted by power in either direction by manipulation of respective shift keys 19, 20 through mechanism described hereinafter.

Values are entered into the machine by depression of numeral keys 22 of the usual keyboard in the various ordinal rows thereof, keys 22 being releasable individually by depression of ordinal clear keys 22a, or collectively by depression of keyboard clear key 23. The value set into the keyboard may be locked therein by proper setting of keyboard lock lever 24. Values introduced into the machine may be registered additively or subtractively on accumulator numeral wheels 17 by depression of plus key 25 or minus key 26, respectively. If desired, add key 28 may be depressed to cause clearing of the keyboard in the usual manner after a single registration in the accumulator.

Values registered in numeral wheels 17 and 18 can be erased, i. e., the registers can be zeroized, by manipulation of respective manually operable resetting handles 29, 30, or by power through depression of return and clear key 31. Depression of key 31 first effects return of carriage 16 to the farthest left position and subsequently effects resetting of both the accumulator 17 and the counter 18, either or neither, depending upon the setting of resetting handles 29 and 30 which are adjustable to control such selective resetting in a manner later described.

The machine is adapted to perform automatic plural order division by means of conventional construction including division starting control lever 32. Automatic predetermined multiplication can also be performed by depression of multiplier selection keys 34 to set up the desired multiplier figure as indicated on dials 35, and by depression of one of multiplication keys 36, 37, or 38 to start the multiplying operation. If accumulative multiplication is desired, the operation is begun by depression of accumulator multiply key 36 which does not control operation of the resetting mechanism also. If it is desired to correct an erroneously entered multiplier figure, multiplier correction key 39 may be depressed to zeroize the multiplier selection mechanism. The multiplying mechanism and the associated control means form the principal subject matter of the instant invention, and are described later in detail.

With the above general organization of parts in mind, various of the above noted mechanisms will be described in detail insofar as deemed necessary or desirable to an understanding of the present invention, it being understood that the mechanism which is not described fully may be of conventional construction, such as that disclosed in the patents to Friden 2,229,889 and 2,371,752.

*Selecting and actuating mechanism (Figures 2, 3, and 6)*

Within casing 15, the frame includes left and right side plates 45, 46 (Figures 2 and 6) which are suitably mounted on base 13 and are interconnected by various cross frame members including transverse brackets 47, 48, 49, and 50 for supporting various mechanisms including the selecting and actuating mechanism.

The values to be introduced into accumulator numeral wheels 17 are selected by means of a plurality of similar orders of selecting mechanism associated with numeral keys 22. For this purpose, each bank or order of keys 22 (Figure 2) cooperates with a pair of similar parallel spring-urged value selecting slides 54 mounted for endwise movement by a suitable supporting linkage and extending through suitable slots in cross frame plate 49. Each slide 54 is provided with cam surfaces of varying inclination for cooperation with suitable pins on certain keys 22 to effect a differential movement of slide 54 on depression of a key 22. One slide 54 of each order cooperates with the "1" to "5" keys 22 of a bank, while the other slide 54 of an order cooperates with the "6" to "9" keys 22 of the bank.

Each bank of keys 22 (Figure 2) has a latching slide 55 of conventional construction associated therewith to latch any depressed key 22 releasably in depressed position against the tension of the spring associated therewith. To release depressed numeral keys, the latching slides 55 may be operated in any convenient manner by zero and clear keys 22a and 23, and by power as controlled by depression of add key 28 as later described.

Each selecting slide 54 (Figure 2) is connected at its rear end with a ten-tooth gear 56 slidably and non-rotatably mounted on longitudinal square shaft 57, whereby movement of slide 54 serves to position the associated gear 56 on shaft 57 with respect to stepped teeth of the associated actuating cylinder 58 in accordance with the value of the depressed numeral key 22. A pair of actuating cylinders 58 for adjacent orders of the machine are mounted on each longitudinal actuating shaft 61, which is suitably journalled in cross plates 48 and 49 and has a suitable bevel gear connection with transverse shaft 62. Shaft 62 is operable cyclically in a single direction from clutch controlled driving means as described hereinafter to provide the only path of power flow from the motor.

As seen in Figure 2, the pair of square shafts 57 associated with each actuating shaft 61 are positioned above and to either side thereof, while the sets of gears 56 on respective square shafts 57 are offset longitudinally of the machine for cooperation with the similarly offset actuating cylinders 58. By the above arrangement and upon each rotation of the actuating means, a selected number of increments of movement can be imparted to each shaft 57 by the associated actuating cylinder 58 in accordance with the adjusted position of gears 56.

Each shaft 57 (Figures 2 and 3) is suitably journalled in cross plates 47, 48, and 49, and between plates 47 and 48 has associated therewith selectively settable plus-minus gears for driving an aligned numeral wheel 17. The plus-minus gears of each order of the machine include a pair 71 slidably and non-rotatably mounted on shaft 57 and having opposed ten-tooth bevel gears 72, 73 arranged for selective engagement with gear 74 on numeral wheel shaft 76. The engagement of gears 72 and 73 with gear 74 is controlled by strap 77 which extends transversely of the machine between each set of plus-minus gears 72, 73 and is mounted by similar spaced arms 78 on transverse shaft 79, which is suitably journalled in side plates 45 and 46. Shaft 79 is controlled in a manner hereinafter described to determine positive registration by meshing gears 72 with gears 74, and negative registration by meshing gears 73 with gears 74. In the neutral position shown in Figure 2, in which gears 72 and 73 may be held normally by suitable spring-urged centralizing means associated with strap 77, carriage shifting can be effected.

During both additive and subtractive registration of values in numeral wheels 17, suitable transfer mechanism of conventional construction may be operative to effect the tens transfer as disclosed, for example, in said Patent No. 2,229,889.

Plus and minus keys (Figures 1 and 2)

As previously stated, the plus and minus keys 25 and 26 (Figure 1) are adapted to control positive and negative registration in the accumulator, and for this purpose they may be connected by suitable mechanism not disclosed herein to effect rocking of shaft 79 (Figure 2) whereby plus key 25 serves to mesh gears 72 with numeral wheel gears 74, and minus key 26 serves to mesh minus gears 73 with numeral wheel gears 74. The plus and minus keys also serve to engage the clutch and motor circuit by suitable means. This mechanism may be of the type disclosed in said Patent No. 2,229,889.

Drive mechanism (Figures 2, 3, and 4)

As stated above, the actuating means is operable cyclically to effect registration in the accumulator of the values set into the machine by depression of the numeral keys. For this purpose a clutch-controlled drive is provided for the actuating mechanism which preferably forms the sole drive means for all power driven parts of the machine. The source of power of the drive means comprises electric motor 81 (Figure 2) provided with drive shaft 82 carrying drive gear 83 (Figure 4) which is connected by idler gear 84 with gear 85 journalled on transverse shaft 62 and carrying driving clutch element or ratchet 87 on its hub. Driven clutch element 88 is secured on shaft 62 and has pivoted thereon springurged clutch pawl 89 having a tooth for engagement with the teeth of ratchet 87 to establish the drive connection. Pawl 89 is spring-urged to operative position but is restrained in the neutral or full cycle position of the parts by clutch control lever 91 pivoted at 92 on side plate 46. Lever 91 carries roller 93, which seats in a depression on clutch element 88 in the full cycle position thereof, and in other positions thereof maintains lever 91 in its clutch engaging position for a purpose later referred to.

It is seen, therefore, that one or more cycles of operation of the actuating mechanism can be determined by oscillation of clutch control lever 91.

Simultaneously with movement of control lever 91, the circuit for motor 81 is established, and for this purpose pin 94 (Figure 4) on the upper arm of clutch control lever 91 is connected by link 95 with lever 96 pivoted at 97 on side plate 46 and connected at its lower end with lever 98 also pivoted on plate 46. Lever 98 has a suitable insulated pin in overlapping relation with spring mounted contact 99 normally spaced from similar contact 99. Thus, clockwise movement of clutch control lever 91 serves through link 95 and lever 96 to oscillate lever 98 in a counter-clockwise direction whereby contacts 99 are engaged to establish the circuit for the motor. It will be noted that roller 93 in maintaining control lever 91 in clutch engaging position when the actuating means is out of full cycle position also serves to maintain contacts 99 closed, so that the motor circuit can be interrupted only in the full cycle position of the parts.

Add key mechanism (Figures 2, 4, and 5)

As previously explained, when add key 28 is in depressed position, the keyboard will be cleared at the end of the first cycle of operation upon depression of the plus or minus keys or can be controlled for release at the end of a plural order operation, for example, a multiplying operation, as will be later explained.

Referring to Figures 4 and 5, add key 28 may be depressed to be latched in depressed position by pin 99 against the urgency of spring 100. As seen in Figure 5, add key 28 carries a pin 101 engaging a slotted link 102 which is guided at its forward end by engagement with a roller stud 103 and at its rearward end is pivotally connected to a lever 104 urged in a clockwise direction by spring 105. The lower end of lever 104 is adjusted into and out of the path of a pin 106 carried by drum 107 on shaft 62 in accordance with the raised and depressed position of the add key. When add key 28 is depressed, the forward end of the link 102 is moved into operative engagement with a pin 108 (Figures 4 and 5) carried by bell crank 109 suitably pivoted on side plate 46 and carrying a link 110 which is urged by spring 111 to place the notched end 112 thereof into engagement with an extension 113 of key release bail 114 (Figures 2 and 5) which extends across the front of the machine in an operative relation with the front ends of the key latching slides 55.

Thus, when the add key 28 is depressed and link 110 (Figure 4) is operatively engaged with the extension 113, oscillation of lever 104 by pin 106 (Figure 5) will cause endwise reciprocation of link 102, oscillation of bell crank 109, and endwise movement of link 110 to rock the key release bail 114. It will be seen in Figure 4 that if link 110 is oscillated in a counter-clockwise direction to disengage its notched end 112 from the extension 113 of the key release bail, that this movement will be ineffective to release the keyboard until restoration of the link 110 to the position shown in Figure 4. This control will be described hereinafter.

Keyboard lock (Figures 2 and 5)

Keyboard lock lever 24 (Figure 5) is suitably pivoted at 116 on side plate 46 and, as shown, is in position to leave the keyboard unlocked. Keyboard lock lever 24 is latched in either adjusted position by yieldable latching payl 117 engaging a suitable pin on the lever. The lower end of lock lever 42 is formed as a bevelled nose 118 which engages a suitable slot in a link 119 which is pivotally connected at 120 to an arm 121 suitably pivoted on side plate 46 at 122. At its forward end, link 119 is guided in a cross frame member 123 and engages by means of a suitable cam slot with a pin 124 on a suitable key locking slide 126 which extends transversely of the machine for locking engagement with the key latch slide 55 (see Figure 2). Oscillation of lever 121 (Figure 5) serves through its arm 127 to release the add key 28 if it is depressed.

Carriage shift mechanism (Figures 2, 4, 5, 7, 8, and 13)

Means are provided for shifting the carriage in either direction from one ordinal position to another by power driven means controlled by manually operable keys. The power driven means preferably comprises elements of the actuating means for entering values into the accumulator register. Carriage 16 (Figures 3 and 7) includes frame 131 having toothed shift rack 132 extending along the rear side thereof with its ends suitably supported on frame 131. The end slots 135 of the rack are formed in part by respective yieldable pawls 136, 137 having respective springs 138 associated therewith. Slots 135 are adapted for engagement by opposite shift pins 141 on shift gear 142 suitably journalled on cross plate 47. Shift gear 142 (Figures 7 and 8) can be rotated selectively in either direction through idler gear 143 to shift the carriage through any desired number of ordinal spaces, each one-half rotation of gear 142 effecting one ordinal spacing of the carriage. Shift gear 142 is centralized by means of cam 144 and centralizing arms 146 having a suitable spring 147 connected therebetween.

In order to rotate shift gear 142 selectively in either direction the two right hand actuating shafts 61 (Figure 8) are extended and are provided with similar controllable drive connections with gear 142. Each connection includes a collar 148 fixed on the associated shaft 61 adjacent the end thereof and having opposite teeth slidably engaged by corresponding slots 149 of shiftable collar 151, which is mounted for sliding movement at the end of shaft 61. Respective collars 151 have smaller teeth 152 for operative engagement with corresponding slots in gear sleeves 153 and 154. Gear sleeve 153 is suitably journalled in cross plate 47 and bracket 155 secured in spaced relation on plate 47, and carries gear 156 meshing with wide idler gear 157 (Figures 7 and 8) which also meshes with idler gear 143. Similarly gear sleeve 154 (Figure 7) has gear 158 which meshes with idler gear 143, and has a similar controllable drive connection with an actuating shaft 61.

Thus, by selective shifting of collars 151 to establish a drive connection, rotation of one of actuating shafts 61 may be utilized to determine rotation of shift gear 142 in a selected direction to effect shifting of carriage 16 in either direction.

Similar mechanisms are provided to control shifting of collars 151. Each mechanism includes a fork 161 (Figures 7 and 8) at the rear end of respective rods 162 and 163 and engaging a suitable annular groove in the associated collar 151. Each of the rods 162, 163 is suitably mounted on the frame for endwise movement and is spring-urged to the position shown in Figure 8 by spring means (not shown). Left shift rod 162 has associated therewith a pin 164 (Figure 13) carried by arm 165 depending from sleeve 166 journaled on shaft 167 which shaft carries arm 168 engaging pin 164. Shaft 167 and arm 168 may be oscillated through arm 169 by shift key 20 to shift the associated rod 162. Rod 163 is engaged by roller 171 carried by arm 172 depending from sleeve 173 which carries arm 174 for operation by shift key 19. Keys 19 and 20 carry respective pins 176 (Figure 4) overlying the upper ends of arms 174 and 169 and also overlying suitable cam surfaces of cam plate 177 (Figure 4) secured on lever 98, so that depression of a shift key rocks lever 98, clutch control lever 91, and circuit control lever 96 to thereby engage the clutch and close the motor circuit as described in connection with plus and minus keys 25, 26.

Thus, carriage 16 carrying numeral wheels 17, 18 can be shifted selectively in either direction through one or more ordinal positions by depression of keys 19 and 20 to control the cyclic operation of the actuating means.

*Revolutions counter (Figures 2 and 3)*

Numeral wheels 18 (Figure 3) of the revolutions counter register the number of actuations of accumulator numeral wheels 17 in a conventional manner by the operation of counter actuator 178, as disclosed, for example, in said Patent No. 2,229,889.

*Resetting mechanism (Figures 2, 4–7, and 13)*

Means are provided for restoring the machine to normal condition between successive operations by shifting the carriage to a predetermined position and by then effecting zero resetting of either the accumulator or the revolutions counter or both of these registers, as determined by settable control means, the operation being carried out by power driven means under control of a manually operable register return and resetting key. This mechanism is of the general type disclosed and claimed in the patent to Carl M. Friden No. 2,294,083 which issued August 25, 1943.

Return and resetting key 31 (Figure 4) is operative upon depression thereof to establish a drive connection between the power driven resetting mechanism and the actuating means and to initiate a carriage shifting and register resetting operation. Key 31 is mounted in a suitable manner on side plate 46 adjacent shift key 20 for substantial endwise movement and is suitably connected to effect rocking movement of shaft 201 (Figures 4 and 5) upon depression of the key. The linkage for effecting such rocking movement may include arm 202 (Figure 13) carrying pin 203.

To engage the drive, shaft 201 has depending arm 181 (Figures 5 and 13) carrying a pin 182 engaging arm 183 pivoted on shaft 184. Arm 183 has finger 186 (Figure 4) engaging a pin 185 so that levers 98 and 96 are operated to engage the clutch and close motor circuit contacts 99. Before the drive begins key 31 also controls the engagement of shift and resetting drive connections.

To initiate the carriage return determined by depression of key 31, shaft 201 carries arm 206 (Figure 13) having pusher link 207 pivoted thereon at 208 and urged downwardly by spring 209. Spring 209 urges notched end 211 of link 207 into engagement with pin 212 carried by arm 213 secured on sleeve 166 previously described as operative to control left shift rod 162. Thus rocking movement of shaft 201 in the direction of the arrow in Figure 13 serves to operate rod 162 to establish the shift drive connection for left-hand shifting.

The rocking of shaft 201 upon depression of key 31 also serves to enable the drive connection from the actuating means to the resetting drive means mounted on the frame of the machine. For this purpose, shaft 201 (Figures 2 and 13) which is rocked upon depression of key 31 carries arm 216 having pusher link 217 pivoted thereon at 218 and urged by spring 219 to engage its notched end 221 with rod 222 slidably mounted in brackets 48 and 49 and normally positioned as shown in Figure 2 by a suitable spring (not shown). Pusher link 217 and arm 216 are similar to link 207 and arm 206, respectively. At its rearward end, rod 222 (Figures 2 and 7) carries fork 226 operatively engaged with shiftable toothed collar 227 similar to collars 151 of the shift mechanism and similarly mounted on one of actuating shafts 61. The teeth of collar 227 are engageable with the slotted end of sleeve 228 suitably journalled in bracket 47 and plate 229 secured thereon. Sleeve 228 (Figure 7) carries cam 231 which is engaged by roller 232 on arm 233 pivoted at 234 on bracket 49 and urged toward cam 231 by spring 236.

The upper end of arm 233 (Figure 7) is slotted to engage roller 237 suitably journalled on pawl 238 pivoted at 239 on slide 241 mounted for endwise movement on bracket 49 by small brackets 242 when carriage 16 is in its left end position as illustrated in Figure 7, pawl 238 is in operative relation with arm 243 pivoted at 244 on bracket 246 depending from a resetting drive member comprising slide 247. Slide 247 has an L-shaped cross section and is mounted for endwise sliding movement on carriage 16 by spaced studs 248. As described later, reciprocation of slide 247 can be utilized to reset either or both of the registers. Arm 243 has "live" one-way acting pawl 251 pivoted thereon intermediate its ends to cooperate with fixed ledge 252 mounted on bracket 47 to lift arm 243 out of the path of pawl 238 during movement of the carriage into its end position. Spring 254 urges arm 243 to the position shown against a suitable stop on the carriage frame. With the parts positioned as illustrated in Figure 7, it is seen that upon movement of slide 241 to the left, lateral pawl 238 will engage the end of arm 243 to reciprocate resetting drive slide 247. The reciprocation of slide 247 is effected in the first cycle during which the carriage is in the end position shown in Figure 7.

Slide 247 (Figure 6) may be operatively related to either or both of resetting rack bars 256 and 257 of the accumulator and counter, respectively, by the adjustment of settable control means to adjust the connections therebetween. For this purpose one end of slide 247 is provided with lateral extension 262 projecting transversely of bars 256 and 257 and provided with respective pins 263 and 264 providing abutments for driving the rack bars. Preferably, the settable control means for engagement with pins 263 and 264, comprise the operating handles 29 and 30 for bars 256 and 257 of similar construction. Handle 29 (Figure 6) is pivoted on post 271 secured in upright position at one end of rack bar 256. Handle 29 carries connecting arm 272 which has seat 273 for selective engagement with pin 263 on slide 247. Handle 30 is similarly constructed being provided with connecting arm 276 for engagement with pin 264 on extension 262 of slide 247.

From the foregoing it is seen that by selective adjustment of connecting arms 272 and 276, operation of either or both of rack bars 256 and 257 by slide 247 can be predetermined, so that both the accumulator or the revolutions counter, or either of them, will be reset to zero upon depression of key 31.

Key 31 may be latched in depressed position during shifting of the carriage to its end position, if displaced therefrom, and the latch may be released during the first cycle of operation of the actuating means when in said end position as disclosed in said Patent No. 2,294,083 under control of override pawl 136 (Figure 7).

Override pawl 136 also serves to interrupt operation of the shift and resetting drive connections after the first cycle (resetting cycle) following the shifting operation. For this purpose, slide 281 (Figures 4 and 7) is mounted for endwise movement on bracket 47 for operation by pawl 136 upon oscillation thereof by shift pins 141. Slide 281 (Figure 4) overlies an arm of bellcrank 282 pivoted on shaft 79 on plate 46 and pivotally connected to link 284 which is also pivotally connected to arm 286 (Figures 4 and 13) depending from shaft 287 suitably mounted on the frame. Shaft 287 (Figures 2, 4 and 13) carries arms 288 and 289 underlying pusher links 207 and 217, respectively.

Thus upon rocking movement of override pawl 136 during the resetting cycle, the above described linkage operates through arms 288 and 289 (Figure 13) to lift pusher links 207 and 217, which results in release of shift push rod 162 and resetting push rod 222, respectively, causing disengagement of the shift and resetting drive connections.

*Multiplier keyboard (Figures 1, 9, and 10)*

The selection mechanism for the multiplier figure is of the type disclosed in said Patent Number 2,371,752. Generally, such mechanism comprises a ten-key keyboard including keys 34 (Figure 10), and a pin carriage 301 associated therewith, having ten ordinal rows of settable stop pins 302 and ten ordinal differentially adjustable elements 303 (Figures 9 and 10) in the form of racks in which digits of the multiplier may be set successively for subsequent control of the multiplying operation. In order to set up the multiplier digits, each pin row includes eight pins corresponding to "1" to "8" keys and a fixed stop corresponding to the "9" key, so that a depressed multiplier key operates through an associated selection lever 304 to set the corresponding pin of an aligned ordinal row to active or raised position. At the same time that a pin of the pin carriage is moved to active position, the aligned rack is released to move into engagement with the pin and thereby be set differentially in accordance with the value of the depressed key. Subsequently, the depressed key operates an escapement mechanism (not shown) to move the pin carriage one ordinal step with respect to the keyboard selection mechanism.

In this manner, the multiplier digits are set up in the multiplier selection mechanism, the setting operation beginning with the highest order digit of the multiplier in the embodiment illustrated. As shown in Figure 1, a setting has been made corresponding to five successive depressions of the "0" key 34.

*Multiplier rack restoring means*

*(Figures 9 and 10)*

The differentially adjusted positions of racks 303 are utilized to control the number of registrations of the multiplicand in the accumulator and to shift the accumulator from left to right after multiplication by each multiplier digit to enable correct registration of the next ordinal product, as well as to shift the pin carriage so that the next higher order rack 303 comes into controlling position with respect to the operation of the machine. To enable exercise of the above control, means is provided for returning each adjusted rack step-by-step to its initial position, this operation being successive from the adjusted rack of lowest order with the shifting of the accumulator and the multiplier pin carriage following the last step of movement of each rack to condition the machine for operation in the next higher order.

The operating mechanism for the racks comprises feed pawl 311 (Figure 10) which is pivotally secured at 312 at the end of an arm 313 pivoted at 314 on the frame. Pawl 311 is urged in a counter-clockwise direction as viewed in Figure 10 by spring 316 which is attached at one end to lug 317 of pawl 311. Lug 317 is spaced from arm 313 in the inactive position of pawl 311 and engages arm 313 to limit the rocking movement of the pawl upon movement to active position. Pawl 311 is held in inactive position by its upward extension 318 engaging behind holding pawl 319 which is secured at the end of shaft 321 which is suitably pivoted in the framework. Both pawls 311 and 319 are maintained inactive until the multiplying operation is started, the inactive position being shown in Figure 10.

In order to actuate pawl 311, arm 313 (Figure 10) is pivotally connected to pitman 326 (Figures 9 and 10) which engages an eccentric cam (not shown) secured on shaft 62 between discs 327. Pitman 326, arm 313, and pawl 311 are reciprocated once for each cycle or rotation of shaft 62, and the operation of the pawl 311 in its active direction occurs at the beginning of each cycle. However, the pawl 311 is held in inactive position until holding pawl 319 is allowed to move in a counter-clockwise direction from the position shown in Figure 10 by oscillation of shaft 321.

*Multiplication keys (Figures 12 and 14)*

The condition of the machine for the multiplying operation as controlled by the multiplication operation keys will now be described. When one of keys 36, 37, or 38 is depressed and latched in depressed position, several functions of the machine are set into operation selectively in accordance with the type of operation determined by the key depressed. These functions include enabling of the control which determines the sign character of the registration of the product, enabling of the power set means for operating the sign character control, enabling of the carriage shift mechanism to determine return of the carriage to an end position, selective enabling of the resetting mechanism for the accumulator and the revolutions counter, setting the control for enabling feed pawl 311 for the multiplier racks, engaging the clutch, and enabling the motor circuit. The mechanisms performing these functions and their relation to multiplication keys 36, 37, and 38 will now be described.

Keys 36 and 37 (Figure 12) are mounted for endwise sliding movement in respective keyboard plates 329 and are urged to raised position by respective springs 331 disposed in the slotted key pins and compressed between the key and lower plate 329. The raised position of the respective keys is determined by the respective latch arms 332 (Figures 12 and 14) engaging the underface of upper plate 329. At their outer end, latch arms 332 are provided with respective latching teeth 333 for engagement with a single latching tooth 336 on latch levers 337 secured on transverse shaft 338 which is suitably pivoted on vertical frame plates 334 and 335 of the multiplier unit. Latch lever 337 is urged in a counter-clockwise direction as viewed in Figure 12 by spring 339 suitably tensioned between the frame and the lower end of lever 337. The lower end of lever 337 is also operatively related with arm 341 of bellcrank 342 whereby the latch for the depressed key 36 or 37 can be released at the end of the multiplying operation as later described. Suitable interlocking means may be provided for preventing simultaneous depression of keys 36 and 37.

*Registration sign character control (Figures 9, 10, 11, 12, and 17)*

Means are provided under control of multiplication keys for selecting the sign character of the registration of the product in the accumulator to be positive if keys 36 or 38 are depressed, and to be negative if key 37 is depressed, such means being enabled by depression of a selected key and subsequently operated by power means also enabled by depression of the key. Pins 343 (Figures 9, 11 and 12) of keys 36 and 37 extend through the adjacent frame plate and engage in respective slots of the forward ends of levers 351 and 352 respectively, which are offset laterally intermediate their ends to extend beyond the adjacent plate 334 (Figure 9) and have their hubs 354 and 355 pivoted on shaft 356.

Lever 351 (Figures 9, 11 and 12) has pin 357 at its rearward end engaging a vertical slot in arm 358 pivotally mounted at 359. Arm 358 is connected by spring 361 with positive setting arm 362 which is pivoted at 363 to power setting means therefor in the form of bell crank 364 pivoted at 365 on frame plate 45. Arm 362 is urged upwardly by spring 361 against a roller 360 on arm 358, so that in effect arms 358 and 362 move with lever 351 upon depression of key 36. At its rearward upwardly offset end arm 362 has notch 366 for engagement with pin 367 at the upper end of lever 368 secured at the end of transverse shaft 79 whose rocking movement, as previously described, moves gate 77 to control the engagement of the plus-minus gears with the numeral wheel gears and therefore control the sign character of the registration.

Normally notched end 366 of arm 362 is maintained below pin 367 as shown in Figure 12, but can move to active position into engagement with pin 367 under influence of spring 361 when key 36 is depressed to move lever 351 to active position as shown in Figure 14. It will be noted that spring 361 provides a yieldable connection whereby arm 362 can be held against movement to active position or moved from active position. Arm 362 engages pin 350 on lever 369 pivoted at 370 on the frame and having ear 371 overlying stop 372 on pin carriage 301 in the right-hand position of carriage 301 and the active rack 303 in any shifted position. Therefore, unless a value is set into the pin carriage, no setting of arm 362 can be made.

Similarly, the rearward end of lever 352 (Figure 10) which is associated with minus multiplication key 37 is connected by spring 373 to arm 374 which is urged against pin 375 on lever 352. Arm 374 is pivotally connected at 363 to actuating bellcrank 364 and having its downwardly offset notched end 376 for engagement with pin 377 at the lower end of lever 368. Arm 374 also has an upward extension engaging pin 350 on lever 369.

Thus, it will be noted that depression of key 36 as illustrated in Figure 12 rocks arm 351 to raise the rearward end thereof to allow notched end 366 of arm 362 to move into engagement with pin 367, whereby upon subsequent counter-clockwise movement of bellcrank 364, lever 368 and shaft 79 will be moved to mesh the plus gears with the numeral wheel gears. Similarly, if key 37 is depressed, lever 352 serves to control the engagement of notched end 376 of arm 374 with pin 377, thereby conditioning the plus-minus control mechanism to determine negative registration of the product in the accumulator. As explained above, however, the arm 362 or arm 374 can only move to active position if lever 369 is free for movement because of entry of a value into the multiplier pin carriage.

Key 38 (Figure 10) overlies a roller 381 of an arm 382 pivotally mounted at 383 and integrally connected with arm 384 (Figure 12). Arm 384 is pivotally connected at its lower end with link 386 which extends rearwardly and is pivotally connected at its rearward end with bell crank 387 pivoted at 388. The horizontal arm of bellcrank 387 is pivotally connected to link 389 which is also pivotally connected to arm 358 so that counterclockwise (Figure 12) movement of arm 384 pulls link 386 forwardly and rocks bellcrank 387 in a counter-clockwise direction to lift arm 358 to tension spring 361 so that arm 362 is urged upwardly to engage notched end 366 with pin 367. The slotted connection of pin 357 with arm 358 provides for selective tensioning of spring 361 from key 36 or key 38.

Thus, each of key 36, 37, and 38 controls the setting of linkage which in turn will cause setting of the plus-minus gears upon oscillation of power setting bellcrank 364.

To effect power setting of the plus-minus gears by oscillation of bell crank 364, roller 401 is provided on bellcrank 364 (Figures 12 and 17) for cooperation with power setting cam 402 which is slidably and non-rotatably mounted on shaft 62 by a suitable slidable driving connection. Cam 402 is normally urged to inactive position, as shown in Figure 17, by spring 406 compressed between the cam and a second cam disc 407 secured on shaft 62 for a purpose not pertinent to the instant invention.

Cam disc 402 (Figures 11 and 17) is engaged by a suitable roller at the upper end of a lever 411 pivoted at 412 on the frame plate 413 and having its lower cam end engaged by roller 414 carried at the end of a lever 416 (Figure 11) pivoted at 417 on frame plate 413. Lever 416 is spring urged in a clockwise direction as viewed in Figure 11 through its pivotal connection at 418 with bell crank 419 which is pivoted at 421. Bellcrank 419 is urged in a counter-clockwise direction by spring 422, therefore also placing lever 416 under a clockwise urgency.

Means are provided for preventing such clockwise movement of the lever 416 to enable the power setting operation, such mechanism being first conditioned by operation of one of the multiplier keys and then subsequently enabled at the end of the shifting, or shifting and resetting operation. The forward end of lever 416 is provided with an offset ear engaged by the upper arm of a bellcrank 426 pivoted at 427 on the frame and urged in a counter-clockwise direction by spring 428. Thus bellcrank 426 latches lever 416 against operative movement. For releasing the latch bellcrank 426, U-shaped lever 429 secured on shaft 383 is provided with a pin 432 overlying the horizontal arm of bellcrank 426 and a roller 433 lying under portions of levers 351 and 352 which are operated by the key depression and also an extension 434 of lever 416. Therefore, upon depression of key 36 or 37, the vertical arm of bellcrank 426 is moved from beneath the end of lever 416. However, this merely conditions the lever 416 for operation, as it is still maintained inoperative by the engagement of latch lever 436 with roller 437. Lever 436 is pivoted at 438 and is urged in a clockwise direction by spring 439. To control the conditioning of power setting enabling lever 416 from the key 38, U-shaped lever 429 is rocked through shaft 383 and arm 440 (Figure 10).

As explained hereinafter, shaft 436 (Figure 11) carrying pawl 436 is oscillated at the end of the carriage shifting or carriage shifting and resetting operation to disable latch pawl 436 and enable the power setting operation.

To prevent re-latching of a multiplication key in depressed position if held there after the multiplying operation, latch lever 436 (Figure 11) has pivotally mounted thereon at 441 a bellcrank 442 carrying a pin 443 overlying the lower arm of U-shaped lever 429. Lever 442 is urged in a clockwise direction by spring 444 and has its upright end adjacent and normally above pin 446 on an arm 447 secured on shaft 338 which also carries key latch arm 337 (Figure 12). As previously explained, the shaft 338 is operated upon depression of a multiplication key so that it will rock arm 447 upwardly and immediately downwardly when the key latch engages so that pin 446 provides a stop for bellcrank 442. Subsequently when the key release mechanism is operated, if the key is maintained depressed (i. e., lever 429 does not operate to restore bellcrank 442) the upright arm of bellcrank 442 will move under pin 446 to maintain the key latch inactive.

At the end of the carriage shifting or carriage shifting and resetting operation, the power setting bellcrank 364 is moved to active position and means are provided for latching said bellcrank and the plus-minus gears controlled thereby in active position. Such means may comprise latch arm 451 (Figure 12) pivoted at 452 on plate 45 and urged in a counter-clockwise direction by spring 450. Latch arm 451 has notched lower end 453 for engagement with pin 454 on bellcrank 364. Thus, the bellcrank 364 can be latched in active position where its lower end is moved away from stop 456 as shown in Figure 16. The latch arm 451 can be moved to inactive position by arm 457 in a manner later described.

*Carriage return and resetting control (Figures 2, 4, 7, 9 to 11, and 13)*

Upon depression of either of multiplication operation keys 36 or 37 means are brought into play to first determine shifting of the carriage to its left end position as a preliminary to the multiplying operation. Where a resetting operation is desired, key 38 is operated and a return and resetting operation may be performed to selectively zeroize the accumulator, the counter, or both in accordance with the adjustment of the resetting mechanism.

Key 38 (Figures 9 and 13) carries a pin 471 which engages the slotted end of a lever 472 pivoted at 473 on frame plate 335. See also Figure 2. Lever 472 carries a pin 474 engaging arm 216 secured on shaft 201. Arm 216 as previously described operates through pusher link 217 to move push rod 222 of the resetting mechanism to operative position; so that upon depression of the key 38, push rod 222 engages the resetting drive connection. At the same time, the oscillation of shaft 201 serves to oscillate arm 206 carrying pusher link 207, which operates through pin 212 and depending arm 213, sleeve 166, arm 165, and pin 164 to move push rod 162 into position to engage the left hand shift mechanism.

The oscillation of shaft 201 also operates through arm 181 and pin 182 to oscillate arm 183 pivoted on shaft 184, finger 186 of which (Figure 4) engages pin 185 at the lower end of lever 98 so that the circuit is closed and the clutch engaged.

The shifting mechanism will operate until the carriage reaches its end position and the resetting mechanism being enabled during the first cycle of operation with the carriage in its left end position, a resetting operation will occur. During the resetting operation override pawl 136 (Figure 7) will be operated to engage slide 281 and move it downwardly. Slide 281 (Figure 4) operates bellcrank 282, link 284, and arm 286 (Figures 4 and 13) depending from a cross shaft 287. Shaft 287 operates through arm 288 to raise push link 207 out of operative engagement with pin 212 and thereby disables the shift mechanism. Shaft 287 also operates through arm 289 to lift push link 217 to also disengage the resetting control from the resetting push rod 222. At the same time that arm 289 lifts the push link 217, it operates lever 509 on shaft 201 which is pivotally connected to link 511 having pivotal connection at its other end to arm 512 on shaft 438. As seen in Figure 11, shaft 438 also carries latch 436 so that this movement rocks the latch pawl 436 to release the power setting control 416 and enable power setting of the plus-minus gears and beginning of a multiplying operation.

Keys 36, 37 operate generally in the same manner to initiate the multiplying operation with a return of the carriage to its left-end position. The respective levers 351 and 352 operated by keys 36 and 37 overlie a pin 521 (Figure 11) carried by lever 522 which is mounted similarly to levers 351 and 352 on shaft 356. Lever 522 has a pin 523 engaging a forked end of link 524 pivotally connected at its lower end to an arm 526 on shaft 527. Shaft 527 (Figure 13) carries an arm 528 having a spring-urged push link 529 pivoted thereon with its notched end engaging a pin 531 carried by an arm 532 depending from shaft 167 which carries arm 168 controlling the left-hand shift mechanism.

Thus, upon depression of either of keys 36 or 37, the operation starts with carriage shifting, but the resetting mechanism is inactive so that the amount entered is cumulative to the amounts in the accumulator and the counter.

The depression of either of keys 36 or 37 through the movement of the lever 522 and link 524 also serves to operate bellcrank 541 (Figure 11) which is secured on shaft 184 (Figure 13) and carrying an upstanding arm 542 pivotally engaged with a clutch engaging slide 543 (Figure 4) having its end abutting pin 94 so that it engages the clutch and also closes the motor circuit.

From the above it is seen that either of multiplication keys 36 or 37 will start operation of the machine to return the carriage to its left end position. During the overstroke cycle with the carriage in its left end position no resetting operation occurs but override pawl 136 operates through slide 281, bellcrank 282, link 284, arm 286, and shaft 287 to rock arm 288 and lift the push link 211 out of engagement with the pin 212 and thereby disable the shift connection to the left shift mechanism. At the same time arm 289 operates through arm 509, link 511, and arm 512 to rock shaft 438 and move latch pawl 436 to release the power setting control 416 in the same manner as described in connection with key 36.

*Multiplier feed enabling mechanism (Figures 10, 11, and 16)*

At about the time the power-setting operation of the plus-minus gears is effected, the feed pawl for the racks of the pin carriage is also enabled. To enable the feed pawl 311 by release of the holding pawl 319, shaft 321 (Figures 10 and 11) upon which holding pawl 319 is mounted carries an arm 461 (Figure 11) having a pin 462 engaging the slotted end of an arm 463 connected to the lever 416 for movement therewith. Pin 462 is also engaged by spring 464 which constantly urges arm 461 and shaft 321 to move the holding pawl in a counter-clockwise direction as viewed in Figure 10. Therefore, upon release and operation of power setting lever 416, arm 461 and the holding pawl are also released to allow the feed pawl 311 to move into engagement with the aligned rack 303. This condition of the parts is shown in Figure 16.

*Accumulator and pin carriage shift control (Figures 9, 10, 11, 13, 14, 16, 18, 12)*

As pointed out, irrespective of which key 36, 37, or 38 is depressed, after the initial carriage return or carriage return and resetting operation, the multiplying operation proceeds in the same manner once it is enabled by the overstroke of the shift mechanism upon return of the carriage to the left end position. It will be recalled that upon such overstroke, the power setting means for the plus-minus gears is brought into play and also the step-by-step return of the aligned multiplier rack is enabled by movement of pawl 311 to active position. Figure 16 shows the operation and condition of the parts during a multiplying operation when the plus-minus gears have been engaged by operation of arm 362 by power-setting bellcrank 364 which is latched in active position. Also the rack 303 in active position is being returned step-by-step with the oscillation of pawl 311.

During its last step of movement, the active rack 303 engages lever 369 and pin 350 overlying the upper end of arm 362 moves arm 362 out of engagement with pin 367 to allow the lever 368, shaft 79, and the plus-minus gears to restore to their neutral position for a shifting operation under control of their usual centralizing means. This release is effected before completion of the registering operation but lever 368, shaft 79 and the plus-minus gears are held in engagement until the end of the last registering cycle by a conventional form of cycle lock (not shown). The oscillating movement of lever 369 also serves through link 556 to lower hooked arm 557. Arm 557 also is constantly oscillated during multiplication by the engagement of the pin 558 carried by disc 402 with arm 559 to which arm 557 is pivotally connected. By such lowering the hooked end of lever 557 can engage the pin 561 on the latch pawl 562 which is pivoted at 563 and normally latches lever 457 secured on shaft 566 in the position shown in Figures 11, 14, and 16. Arm 457 is connected by link 567 with centralizing lever 568 pivoted on shaft 388 and having slotted end 571 for engagement with pin 377 of the lever 368 so that during the shifting cycle the lever 368, shaft 79, and plus-minus gears are positively held in centered position where they are moved by the well-known form of centralizing mechanism.

The rocking movement of arm 457 and shaft 566 also serves through an arm 601 and link 576 (Figure 18) to rock arm 577 on shaft 321 carrying holding pawl 319, and therefore move the actuating pawl 311 to inactive position during a shifting cycle. Shaft 566 also serves to engage the right shift mechanism and for this purpose has arm 581 (Figure 13) slidably and non-rotatably engaged thereon. Arm 581 is normally out of alignment with pin 171 controlling right shift push rod 163 being held against the urgency of spring 582 by slide 583 which is slidably mounted on shaft 566 and abutting shift rack 584 of pin carriage 301. The first step of shifting movement of carriage 301 during setting up of the multiplier is insufficient to align arm 581 with pin 171, and such alignment occurs after the second shift, i. e., when the second multiplier digit is entered, which is the extent of sliding movement permitted slide 583 and arm 581. Shaft 566 (Figures 9 and 10) also carries arm 591 having a pin 592 engaged with the grooved collar 593 carrying slidable actuator 594 for shift rack 584 of the pin carriage 301 so that this shift is also enabled by the same rocking movement of shaft 566 against the urgency of spring 596 (Figure 13) connected to arm 581. Actuator 594 is driven from shaft 597 (Figure 10) as described in said Patent Number 2,371,752.

The accumulator and pin carriage shift mechanisms during the multiplying operation are disabled after one cycle of movement if a value other than zero is set in the next active multiplier rack 303. Shaft 566 (Figures 12 and 18) has restoring arm 601 secured thereon which in latched position of arm 457 shown in Figure 12 lies out of the path of pin 558 on disc 402. However, upon delatching of arm 457 and rocking of arm 457 and shaft 566, arm 601 is positioned as shown in full lines in Figure 18 and during the shift cycle is engaged by pin 558 to restore arm 457 for latching engagement by latch pawl 562 under the influence of its spring 602 as shown in Figure 12.

Power-setting bellcrank 364 is also delatched during the shift cycle by the engagement of lever 457 with pin 603 on latch lever 451 so that the plus-minus gears which are in inactive position during shifting can be reset by bellcrank 364 and cam disc 402 at the beginning of the next cycle if the next active multiplier rack 303 is set to a multiplier digit value. If rack 303 is not set, i. e., is at zero, another shifting cycle follows immediately by the positioning of lever 369 as described.

Multiplier correction. Correction key 39 for erasing amounts set into the multiplier pin carriage without entry of values into the accumulator or counter may be similar to and operates in the same manner as shown in said Patent Number 2,371,752.

*Multiplication key release (Figures 10 and 12)*

The release of a depressed multiplication key is controlled in the manner disclosed in said Patent Number 2,371,752. Briefly, as the pin carriage 301 is shifted to its normal inactive position where the leftmost indicating dial is to the right of the right opening therefor in the casing, carriage 301 (Figure 10) engages the upright end of pivoted spring-urged bellcrank 342 to effect rocking movement thereof. As seen in Figure 12, the other end 341 of bellcrank 342 is operatively related to the lower end of lever 337 of the key latch assembly so that the rocking movement of bellcrank 342 acts to move latch tooth 336 out of engagement with the depressed key, which is therefore free to rise. Bellcrank 342 is held in delatching position by the pin carriage until another multiplifier factor is entered into the carriage. It will be understood that upon depression of any multiplier key 34, the pin carriage is shifted under the control of its escapement mechanism so that bellcrank 342 is disabled with respect to the multiplication key latch mechanism. This is true whether or not the keys 34 from one to nine are used in entering a multiplier digit or whether the zero key 34 is used in order to control a carriage tabulation to a selected ordinal position.

*Keyboard release in multiplication (Figures 4, 5, and 11)*

If desired, the multiplicand value represented by the depressed numeral keys 22 may be cleared from the machine automatically at the end of a multiplying operation. It will be recalled that link 110 (Figure 4) is spring-urged into operative relation with extension 113 of the numeral key-release bail. Link 110 has a pin 606 for engagement by an arm 607 secured on shaft 383 so that clockwise movement of shaft 383 and arm 607 as viewed in Figure 4 will disengage link 110 from bail end 113 to disable the numeral key release linkage. Shaft 383 (Figure 11) carries bellcrank 429 which is rocked by any of the multiplication keys 36 and 37 and arm 440 (Figure 10) which is rocked by key 38. Thus upon depression of one of the keys shaft 383 and arm 607 will be operated as described above. During the last cycle of a multiplying operation, the key latch levers 337 are operated to release the depressed multiplication key as described above, and this operation occurs a sufficient time in advance of the engagement of pin 106 (Figure 5) with lever 104 in operating the numeral key release mechanism to allow link 110 to move into engagement with bail end 113 so that the numeral keys will be released at the end of a multiplying operation if add key 28 is depressed.

*Operation*

The operation of the machine will be summarized brefly with respect to the various multiplication keys 36, 37, and 38. Assuming that a multiplicand has been set in the keyboard by depression of selected keys 22 and that a multiplier value has been set into the pin carriage 301 by depression of selected keys 34 which serves to cause an escapement shifting of the pin carriage, a number of steps corresponding to the number of multiplier digits, for example, five digits as shown in Figure 1. The selected multiplication operation key is then depressed, for example, key 36 as shown in Figure 14. When depressed, the key is engaged and latched by the latch tooth 336. The depression of key 36 operates through the lever 351 (Figure 11) and arm 358 to tension the spring 361 which moves the arm 362 to engage its notched end 366 with the pin 367 as shown in Figure 14 to condition for setting of the plus-minus gears to their plus registering position. At the same time, key 36 operates through bellcrank 429 to move latching bellcrank 426 out from beneath the end of lever 416 to condition the power setting means for operation, this same operation also conditioning the lever 416 to set the feed pawl 311 for restoring the racks of the pin carriage to adjusted position.

Depression of key 36 also operates through lever 351, pin 521 (Figure 11), lever 522, link 524, arm 526 and shaft 527 to operate push link 529 (Figure 13), arm 532 and shaft 167 to operate the left shift push rod 162 to engage the shift for a left-hand shifting operation. The link 524 also operates through arm 541 and shaft 184, arm 542 (Figure 4) and slide 543 to engage the clutch and close the motor circuit.

The identical operations performed by the key 36 would be performed by the key 37 upon depression thereof except that lever 352 would be operative and would determine the engagement of arm 374 with pin 377 to determine minus registration upon meshing of the minus gears with the numeral wheel gears.

With both keys 36 and 37 the first operation, therefore, is the return of the carriage to its left end position, after which the multiplying operation proper is started.

If key 38 is depressed, a carriage return operation with resetting of the accumulator, the revolutions counter, or either of them is determined in accordance with the setting of the control handles 29 and 30. Depression of key 38 operates through arm 332 (Figure 10), link 386 (Figure 12), bellcrank 387, link 389, spring 361 and arm 362 to engage notched end 366 thereof with pin 367 to determine positive registration. Key 38 also operates through arm 440 (Figure 10), shaft 383 (Figure 11) and bellcrank 429 to release latch bellcrank 426. Key 38 also operates through pin 471 (Figure 2) lever 472, to operate arm 216 and push link 217 to engage the resetting mechanism. The oscillation of shaft 201 also serves through arm 206 (Figure 13) and pusher link 207 to engage the left-hand shift mechanism. The shaft 201 upon oscillation also operates through arm 181 and pin 182 (Figure 4) to oscillate arm 183 to engage the clutch and close the motor circuit. Therefore, upon depression of the key 38, the first operation will be a return of the carriage and resetting of the registers with the carriage positioned in its left hand position.

After the initial operation described above with respect to keys 36, 37, and 38, the remaining operations are similar and are dependent upon the oscillation of override pawl 136 (Figure 7) during the cycle after the last shift cycle, i. e., the resetting cycle if a resetting operation is determined, which operates through slide 281 (Figures 4 and 7), bellcrank 282, link 284, and arm 286 to rock shaft 287. Shaft 287 (Figure 13) carries arm 289 which serves to lift push link 217, disabling the resetting drive connection after the resetting operation. Arm 288 on shaft 287 operates to lift push link 207 and thereby disable the left-hand shift connection after the return and resetting operation, or the return operation as the case may be. Arm 289 also operates through lever 509 (Figure 2), link 511, arm 512 to rock shaft 438 which carries latch pawl 436 (Figure 11) to rock the latch pawl and release the setting control lever 416.

When control lever 416 (Figure 11) is rocked under the influence of spring 422, it operates through arm 463 and arm 461 on shaft 321 to enable the feed pawl 311 for the racks 303 of the multiplier carriage, and also operates through roller 414 and lever 411 to move power-setting cam 402 into alignment with power setting bellcrank 364. At the beginning of the first registering cycle, cam 402 becomes active to rock power setting bellcrank 364 and engage either the plus or minus gears, as selected for the multiplying operation, when the feed pawl 311 also becomes active.

As explained, the feed pawl 311 returns the aligned rack 303 step-by-step and during the last step of movement of the rack, it engages and oscillates lever 369 which is depressed at its rearward end as shown in Figure 18, for example, to disengage setting arm 362 from pin 367. Thus lever 368 and shaft 79 are freed to be centralized by conventional centralizer means. This movement of lever 369 also operates through link 566 to lower pitman 557 to engage and delatch latch pawl 562 for arm 457 which, in turn, disables the latch lever 451 for power setting bellcrank 364. Arm 457 is connected by link 567 to centralizer lever 568 to rock this lever into engagement with pin 377. If pin 377 is not in central neutral position where the plus-minus gears are disengaged, pin 377 blocks movement of arm 457 and hence prevents engagement of the shift mechanism. Arm 457 also operates to rock shaft 566 which through arm 601, link 576, and arm 577 rocks shaft 321 to disable the feed pawl 311.

Rocking of shaft 566 (Figure 13) by arm 457 also operates arm 581 to engage the right shift mechanism for the accumulator carriage and through arm 591 (Figure 10) to enable the shift for the pin carriage. The rocking movement of arm 601 with shaft 566 carries its upper end into the path of pin 558 so that arm 601, shaft 566, and arm 457 are restored to the condition shown in Figure 12 at the end of the shift cycle when latch pawl 562 again becomes effective.

The shifting movement carries the lever 369 out of alignment with restored rack 303 and into alignment with the next adjusted rack so that it is again free to rock in a clockwise direction to return to the position shown in Figure 14 where the arm 362 is again operatively engaged with the pin 367 and will be reset by the power setting cam 402 and bellcrank 364 at the beginning of the ensuing cycle.

The above described cycle of operations is repeated until the number of adjusted racks 303 of the pin carriage are restored to zero and the pin carriage is at its rightmost position. The last step of movement of the pin carriage operates through the bellcrank 342 to delatch the depressed multiplication key.

If it is desired to have a release of the keyboard at the end of the operation, the add key 28 may be depressed so that the key release mechanism is enabled for operation by the actuating means, but is disabled with respect to the key release bail until the last cycle of operation through the action of bellcrank 429 (Figure 11), shaft 383 and arm 607 (Figure 4).

When the key 38 is employed, adjustment of the resetting controls 29 and 30 may provide for selective accumulation of products or multipliers in the accumulator and revolutions counter, respectively. Also, if desired, keyboard lock 24 may be employed where a constant factor is set in the multiplicand keyboard on the keys 22 and the twirler extension 17a of the numeral wheels may be employed to set any desired factors therein, as will appear advantageous in various operations.

When it is desired to employ the multiplication mechanism for repeated additions or subtractions, the number to be added or subtracted is set by the keys 22, and the number of additions or subtractions is entered into the multiplier unit by depressing the appropriate key. As explained a one-step shift of the pin carriage 301 is insufficient to align 581 (Figure 13) with right-hand shift push rod 163, so that during the subsequent positive or negative multiplying operation, the accumulator carriage will not be shifted. However, the pin carriage 301 will be restored in the usual fashion to terminate the machine operation.

We claim:

1. In a calculating machine having an accumulator, means for ordinally shifting said accumulator, and means for clearing said accumulator; multiplying mechanism for controlling the registration of a product in said accumulator, a control key, means operated by depression of said control key for causing operation of said shifting means to position said accumulator in the first ordinal position thereof, means controlled by said key for effecting operation of said clearing means, said multiplying mechanism including means operatively conditioned by said key and operated by said shifting means after said accumulator has been positioned in the first ordinal position for initiating a plural order multiplying operation.

2. In a calculating machine, the combination of an accumulator, means for effecting ordinal shifting of said accumulator, and means for selectively effecting clearing of said accumulator, of multiplying mechanism including a manually depressible control key, multiplying means for carrying out a plural order multiplying operation and controlling the registration of a product in said accumulator, means controlled by said key upon depression thereof for conditioning said multiplying means for operation, means controlled by said key upon depression thereof for initiating operation of said shifting and clearing means, means for initiating operation of said multiplying means and means actuated by said shifting means for terminating operation of said shifting and clearing means and for operating said means for initiating operation of said multiplying means.

3. A calculating machine having an accumulator and a revolution counter in an ordinally shiftable carriage, means for shifting said carriage, multiplication mechanism for controlling the registration of a product in said accumulator and a multiplier in said counter, operation control means adapted to be manually actuated, means controlled by said control means upon actuation thereof for operatively conditioning said multiplication mechanism, means controlled by said control means upon actuation thereof for initiating operation of said shifting means to shift said carriage to the first ordinal position, and means actuated by said shifting means in the first ordinal position of said carriage for initiating operation of said multiplication mechanism.

4. A calculating machine having a product register and a multiplier register in an ordinally shiftable carriage, means for shifting said carriage, register clearing means, multiplication mechanism for controlling the registration of a product in said product register and a multiplier in said multiplier register, operation control means adapted to be manually actuated, means controlled by said control means upon actuation thereof for operatively conditioning said multiplication mechanism, means controlled by said control means upon actuation thereof for initiating operation of said carriage shifting means and said register clearing means, and means actuated by said shifting means in the first ordinal position of said carriage for initiating operation of said multiplication mechanism.

5. A calculating machine having an ordinally shiftable accumulator, means for positioning said accumulator to receive a product, a multiplication mechanism for controlling the operation of registering the product in said accumulator including a control member which, when moved to operative position, causes intiation of the registering operation, two latches normally holding said control member in inoperative position, a control key, one of said latches being unlatched upon depression of said key, means controlled by depression of said key for causing actuation of said accumulator positioning means, means controlled by said positioning means and actuated at the conclusion of the positioning operation to unlatch the second of said two latches to release said control member for movement to operative position, whereby upon depression of said control key the accumulator is first positioned to receive the product and then the product is registered therein under the control of the multiplication mechanism.

6. In a calculating machine having an accumulator in an ordinally shiftable carriage, means for controlling registrations in said accumulator including an adjustable value-selecting mechanism, and means selectively operable to control positive or negative transmission of the selected value to said accumulator, means operable to position said carriage in the first ordinal position, and a driving means: control means including manually-actuated means selectively operable for conditioning said transmission control for positive or negative registration in said accumulator, means operable by said manually-actuated means for initiating operation of said carriage positioning means by said driving means, and means actuated by said driving means rendered operative only when said carriage is positioned in said first ordinal position to operate said transmission control to cause registration of said selected value in said accumulator.

7. In a calculating machine having an accumulator in an ordinally shiftable carriage, means for controlling registrations in said accumulator including an adjustable value-selecting mechanism and means adjustable to cause positive or negative registration of the selected value in said accumulator, means operable to position said carriage in the first ordinal position, and a driving means: positive and negative operation control keys, means responsive to depression of either of said keys for intiating operation of said positioning means by said driving means, and means selectively conditioned by the key depressed, actuated by said driving means and operative only when said carriage is positioned in said first ordinal position to adjust said adjustable means to selectively cause positive or negative registration of said selected value in said accumulator.

CARL M. FRIDEN.
ANTHONY B. MACHADO.